(12) United States Patent
Chakraborty

(10) Patent No.: US 7,110,454 B1
(45) Date of Patent: Sep. 19, 2006

(54) INTEGRATED METHOD FOR SCENE CHANGE DETECTION

(75) Inventor: Amit Chakraborty, Cranbury, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 09/468,653

(22) Filed: Dec. 21, 1999

(51) Int. Cl.
H04B 1/66 (2006.01)
H04N 5/14 (2006.01)
G06K 9/36 (2006.01)

(52) U.S. Cl. .................. 375/240.16; 348/700; 382/236
(58) Field of Classification Search ................ 348/700, 348/699, 402.1, 407.1, 413.1, 416.1; 375/240.16, 375/240.25; 382/236, 243, 268, 266, 235, 382/173; 345/700
See application file for complete search history.

(56) References Cited

U.S. PATENT DOCUMENTS 5,635,982 A * 6/1997 Zhang et al. ............... 382/173
5,767,922 A * 6/1998 Zabih et al. ................ 348/700
5,835,163 A * 11/1998 Liou et al. .................. 348/700
6,278,446 B1 * 8/2001 Liou et al. .................. 345/700
6,327,390 B1 * 12/2001 Sun et al. .................... 382/235
6,381,278 B1 * 4/2002 Shin et al. ............. 375/240.16
6,449,392 B1 * 9/2002 Divakaran et al. .......... 382/235

* cited by examiner

Primary Examiner—Gims S. Philippe
(74) Attorney, Agent, or Firm—Donald B. Paschburg; F. Chau & Associates, LLP

(57) ABSTRACT

A system and method for detecting scene changes in a sequence of video frames utilizing a combination of a plurality of difference metrics including an interframe difference metric, a histogram difference metric and an interframe variance difference metric, as well as adaptive threshold level selection methods to dynamically select appropriate threshold levels for each of the difference metrics. The interframe and histogram difference metrics are used to identify abrupt scene changes and the interframe variance difference metric is used to identify gradual scene changes. The identified gradual and abrupt scene changes are validated by applying a plurality of conditions.

16 Claims, 4 Drawing Sheets

INTEGRATED METHOD FOR SCENE CHANGE DETECTION

BACKGROUND

1. Technical Field

The present invention relates generally to digital video processing and analysis and, more specifically, to a system and method for detecting scene changes utilizing a combination of a plurality of difference metrics applied to successive video frames and adaptive threshold selection methods for the metrics so as to identify abrupt and gradual scene changes.

2. Description of Related Art

The use of digital video in multimedia systems is becoming quite popular. Moreover, videos are playing an increasingly important role in both education and commerce. Indeed, video is utilized in connection with a myriad of applications such as multimedia systems, defense/civilian satellites, scientific experiments, biomedical imaging, industrial inspections, home entertainment systems, etc. As a result, there has been a rapid increase in the amount of video data generated. The process of searching through a video so as to annotate and/or obtain a quick overview of the video content can be tedious and time consuming using conventional digital video applications such as fast forward or rewind. Therefore, in order to search for desired video content in an effective and efficient manner, the videos should be appropriately indexed into a database. In this manner, a user can readily retrieve desired videos or sections of video without having to browse the entire video database.

The primary task in this indexing process is segmenting the video into meaningful continuous units or "shots," which affords an efficient method for video browsing and content based retrieval. A "shot" or "take" in video parlance refers to a contiguous recording of one or more video frames depicting a continuous action in time and space. Typically, transitions between shots (also referred to as "scene changes" or "cuts") are created intentionally by film directors. A statistical characterization of a video can also be performed in terms of the different attributes of a shot such as their length and type (close, medium, long, camera movement etc.). At a global level, this can be used for video clustering.

During a shot, the camera might remain fixed or it might undergo one of the characteristic motions, i.e. panning, zooming, tilting or tracking. In general, the process of segmenting a video into a sequence of shots is non-trivial, complicated by the large variety of transitions between shots made possible by the modern editing machines. Shot transitions consisting primarily of visually abrupt changes or camera breaks (also called "straight cuts") are readily identifiable by examining frame to frame intensity changes at the pixel level.

In many cases, however, a transition between two shots is made in a gradual manner using special editing machines to achieve a visually pleasing effect. These type of gradual changes are also called "optical cuts." There are several types of optical cuts, such as "fade in", "fade out", "dissolve", "wipe", "flips", "superimpose", "blow-ups", "move-ins", etc. (see, e.g., P. Aigrain, et al., "The automatic real time analysis of film editing and transition effects and its applications," *Computer Graphics*, 18:93–103, 1994). In general, the process of detecting optical cuts is challenging and requires a more detailed analysis of the video at a global scale rather than merely analyzing the interframe difference such as the case with conventional methods.

Conventional methods related to scene change detection began with the study of frame difference signals, where it was demonstrated that the gamma distribution provides a good fit to the probability density function of frame difference signals (see, A. Seyler, "Probability distributions of television frame differences," *Proceedings of the IEEE*, 5:355–366, 1965). Subsequent studies of frame difference signals were performed in connection with four different types of videos, a sports video, an action video, a talk show and a cartoon animation by subdividing the images into 8×8 blocks with each block being represented by the average value, and then computing the difference metric as the average value of the magnitude of the interframe difference (see D. Coll, et al., "Image activity characteristics in broadcast television," *IEEE Transactions on Communications*, 26:1201–1206, 1976). It was shown that this measure was capable of detecting shot boundaries with reasonable accuracy.

Other conventional methods for cut detection have been recently proposed that are characterized either as frame difference methods or as histogram based methods. For instance, with the frame difference method, assuming that $f_{ij}(t)$ is the representative pixel value at location (i,j) and at time t, the metric is given by either:

$$d_t = \sum_{ij} (f_{ij}(t) - f_{ij}(t-1))^2 \text{ or}$$

$$d_t = \sum_{ij} U((f_{ij}(t) - f_{ij}(t-1)) \geq T_d)$$

where U(x)=1 if the condition x is satisfied, and zero otherwise, and where $T_d$ is an appropriate threshold. In the first case, the magnitude of the difference is considered (sometimes in place of the square of the difference, the magnitude of the difference is also considered). In the second case, the number of pixels undergoing changes are picked up. A cut is determined if $d_t$ exceeds an appropriate threshold.

One problem associated with using these interframe approaches for detecting scene changes, however, is that they cannot adequately cope with conditions such as noise, minor illumination changes and camera motion. When such conditions exist, the interframe difference will, in virtually all instances, be large, thereby resulting in a false alarm. To obviate this problem, several techniques have been proposed including the three and five frame scheme (see K. Otsuji, et al., "Video browsing using brightness data," *Proc. SPIE: Visual communications and Image Processing*, pages 980–989, 1991) and a twin-comparison approach (see H. Zhang, et al., "Automatic partitioning of full motion video," *Multimedia Systems*, 1:10–28, 1993), where a simple motion analysis is used to check whether an actual transition has occurred. This process, however, is typically computationally extensive. In addition, despite the corrections, these methods are not able to detect gradual changes.

Because of the extreme sensitivity of the interframe difference methods to object motion, illumination changes and camera motion, intensity histogram comparison techniques have been proposed (see, e.g., Y. Tonomura, "Video handling based on structured information for hypermedia systems," *Proc. ACM: Multimedia Information Systems*, Singapore, pp. 333–344, 1991; and Y.Z. Hsu, et al., "New likelihood test methods for change detection in image sequences," *Computer Vision, Graphics and Image Processing*, 26:73–106, 1984). In general, with such methods, cuts are detected using absolute sum of the difference of intensity histogram, i.e., if:

$$\sum_i \|H_i(t) - H_i(t-1)\| \geq T_h$$

where $H_i(t)$ is the count in the $i^{th}$ bin at time t and where $T_h$ is an appropriate threshold. This method assumes that brightness distribution is related to the image which changes only if the image changes. The histogram is likely to be minimally affected by small object motion and even less sensitive to noise, thereby resulting in a reduction of the amount of false alarms. In some instances, rather than using the above mentioned metric, either one of the following correlation metrics may be used:

$$d_t = \sum_i \frac{(H_i(t) - H_i(t-1))^2}{H_i(t-1)} \quad \text{or}$$

$$d_t = \sum_i \frac{(H_i(t) - H_i(t-1))^2}{H_i(t) + H_i(t-1))^2}$$

whereby a scene change will be detected if the above metrics exceed a predetermined threshold. Instead of analyzing the intensity, other conventional techniques have utilized the color space for video segmentation (see, e.g., U. Gargi et al., "Evaluation of video sequence indexing and hierarchical video indexing," *Proc. SPIE: Storage and Retrieval for Image and Video Databases*, San Jose, pp.144–151, 1995; and S. Devadiga, et al., "Semiautomatic video database system," *Proc. SPIE: Storage and Retrieval for Image and Video Databases*, San Jose, pp. 262–267, 1995.)

Another conventional metric that is utilized is known as the Kolmogorov-Smirinov test metric. This metric is based on the cumulative histogram sum (CHP) of the previous and the current frames:

$$d_t = \text{MAX}_j \|CHP_j(t) - CHP_j(t-1)\|$$

where $CHP_j(t)$ is the cumulative histogram sum of the $j^{th}$ intensity value in frame t (see N. V. Patel, et al., "Compressed video processing for cut detection," *IEEE Proc. Vis. Image Signal Proc.*, 143:315–323, 1996).

In addition to the above mentioned methods, model based methods have also been suggested to improve the cut detection performance. These methods attempt to model the distribution of the pixel differences for the various types of cuts that are possible, which is then used for scene change detection.

Virtually all the above conventional cut detection methods utilize uncompressed video for scene change detection. While several methods purportedly operate in the compressed domain, in reality, the methods select a subset of the DCT coefficients for each one of the MJPEG blocks and continue with the processing after the blocks are decompressed (see, e.g., F. Arman, et al., "Image processing on compressed data for large video databases," Proc. *ACM Multimedia*, 1993; and E. Deadorff, et al., "Video scene decomposition with motion picture parser," *Proc. SPIE: Electronic Imaging, Science and Technology*, 1994). Also, when MPEG video is used, only the I frames are considered, thereby reducing the problem to an equivalent MJPEG problem (see J. Meng, et al., "Scene change detection in MPEG compressed video sequence," *Proc. SPIE: Digital Video Compression Algorithms and Techniques*, 2419:14–25, 1995). Motion vectors directly from the P and B frames of an MPEG video are rarely considered primarily because they are very unreliable for any real computation and, in any event, can be estimated from the I frames.

Shots and the associated cuts can be classified into several types as a convention for the directors and camera operators, such as:

Static shots: These are shots that are taken without moving the camera. This category includes close, medium, full and long shots. They all result in different types of interframe differences. For instance, close shots produce more changes than long shots and so on.

Camera moves: These shots include the classical camera movements i.e. zoom, tilt, pan etc. The interframe difference is obviously a function of the camera speed.

Tracking shots: In these shots, the camera tries to follow the target object. Again, the interframe difference depends on the relative motion between the camera and the object.

Because different types of videos with different motion types result in different interframe changes, the criteria to detect cuts should be different when different types of shots are processed. Therefore, a method that utilizes soft thresholds that are adaptively selected based on the types of shots would be advantageous.

Another issue is that since films and videos have different frame rates, when film is converted to video, there is a need to compensate for this discrepancy. Typically, 3:2 pulldown is effected, whereby every other film frame is played slightly longer. This results in duplicate frames in the resulting video, which may result in false alarms if the cut method is based solely on interframe difference. This problem is particularly true for animations.

As for the different types of transitions, some of the most frequent ones are as follows:

Fade in: The incoming scene gradually appears starting from a blank screen;

Fade out: The complete reverse of the above;

Dissolve: The transition is characterized by a linear interpolation between the last frame of the outgoing scene and the first frame of the incoming scene;

Wipe: The incoming scene gradually replaces the outgoing scene from one end of the screen to the other; and Flip: The outgoing scene is squeezed out from one corner to the other revealing the incoming scene.

In addition to the above transition types, other types such as freeze-frame, blow up, move in, montage, etc. are also used. Another issue other than the scene-change type is the duration. While in theory the duration of the scenes in a video could be arbitrary, normally the duration is limited to a reasonable level based on the duration of the intermittent shots.

The majority of the above-mentioned conventional cut detection methods do not employ a global strategy for identifying cuts in video as they typically employ only one metric for identifying scene changes. In addition, such methods typically employ hard thresholds resulting in the successful identification of scene changes for only certain sections of a video or, at best, for only certain types of video. Accordingly, an improved system and method for accurately detecting scene changes, both abrupt and gradual, is highly desirable.

SUMMARY OF THE INVENTION

The present invention is directed to a video processing system and method employing an integrated process for segmenting a video into shots by successively identifying scene changes, both abrupt and gradual. A combination of a plurality of difference metrics are processed in an integrated fashion to identify and verify both gradual and abrupt scene changes in the video. Such method may be used to generate a content-based visual summary of video and facilitate digital video browsing and indexing.

In one aspect of the present invention, a method for detecting scene changes in a video comprises the steps of computing a plurality of difference metrics of successive frames in a sequence of video frames, identifying candidate scene changes in the sequence of video frames using each of the computed difference metrics, and verifying that the candidate scene changes satisfy one or more predetermined condition for selecting final scene changes.

In another aspect of the present invention, the plurality of difference metrics that are computed on successive video frames comprise an interframe difference metric, a histogram difference metric, and an interframe variance difference metric. A series of candidate scene changes are identified for each of these metrics by comparing each of the computed metrics for the successive frames to threshold levels associated with the respective difference metric.

In yet another aspect of the present invention each of the threshold levels for the difference metric are dynamically selected based on the detected parameters of the video data. Indeed, in contrast to conventional methods which utilize predetermined threshold, the present invention employs an adaptive threshold for each metric.

In accordance with another aspect of the present invention, an order statistics is employed for the threshold selection process in the case of the difference of variance metric.

In yet another aspect of the present invention, the process of verifying that the candidate scene changes satisfy at least one predetermined condition for selecting final scene changes comprises the steps of selecting each video frame that was identified as a candidate scene change based on both the interframe difference metric and the histogram difference metric as a potential abrupt scene change, and removing a least probable one of any two successive potential abrupt scene changes, if a distance between the two successive potential abrupt scene changes is less than a predetermined minimum shot duration.

In another aspect, the verification process further comprises the steps of selecting as a potential gradual scene change, each video frame that was identified as a candidate scene change based on the interframe variance difference metric, and then for each remaining potential abrupt scene change, removing as a potential gradual scene change, each video frame that was also selected as a potential abrupt scene change.

These and other objects, features and advantages of the present invention will be described or become apparent from the following detailed description of preferred embodiments, which is to be read in connection with the accompanying drawings.

DETAILED DESCRIPTION OF PREFERRED EMBODIMENTS

It is to be understood that the system modules and method steps described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM and Flash memory), and executable by any device or machine comprising suitable architecture. It is to be further understood that since the system modules and method steps depicted in the accompanying Figures are preferably implemented in software, the actual connections between the system modules and the flow of the process steps may differ depending upon the manner in which the present invention is programmed. Given the teachings herein, one of ordinary skill in the related art will be able to contemplate these and similar implementations or configurations of the present invention.

Figure 1:
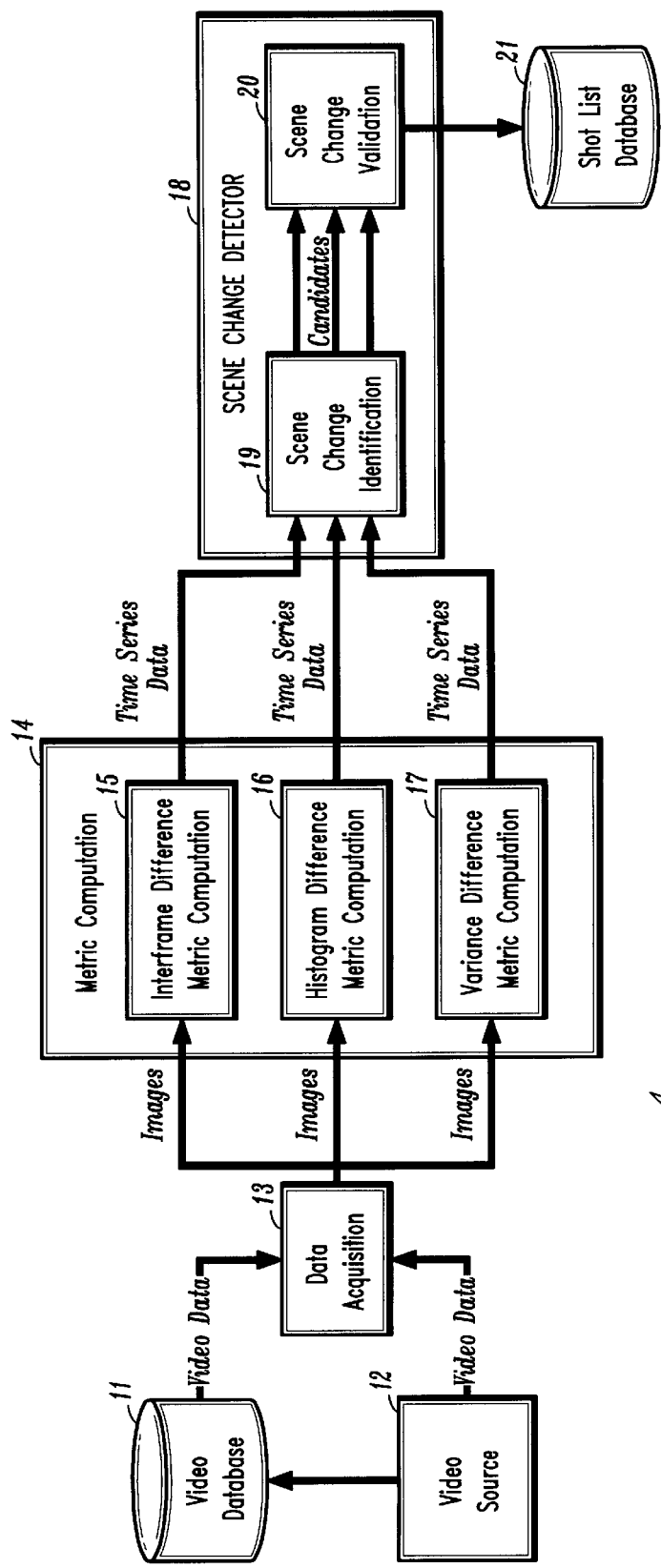
FIG. 1 is a block diagram of a video processing system for detecting scene changes according to an embodiment of the present invention.

Referring to FIG. 1, a block diagram illustrates a video processing system for detecting scene changes according to an embodiment of the present invention. It is to be understood that the system 10 may be employed in any video processing system for generating a content-based visual summary of video to facilitate, e.g., digital video indexing and browsing. The system 10 comprises a video database 11 for storing video data such as one or more video files. A video source 12 may provide video data for storage in database 11 or real-time input to a data acquisition module 13.

The data acquisition module 13 captures or otherwise extracts video frames in the video data using conventional techniques. The video data input to the data acquisition module (from the database 11 and/or video source 12) may be either compressed or decompressed video data. Compressed video data may be a MJPEG (Motion Joint Photographic Experts Group) data stream or a MPEG (Moving Picture Experts Group) data stream. Any conventional process may be employed for extracting the individual frames from a MJPEG data stream. For an MPEG data stream, the I frames are extracted and used for further processing. This is a standard approach as it is generally acknowledged in the art that most of the information is carried in the I frames. Indeed, if there is a scene change at any particular point in the video data, it is likely that there would be an I frame in the immediate neighborhood, since, in such as case, the P and B frames would not be adequate in encoding this. It is to be understood that in either case, i.e. individual frames in an MJPEG movie or in the case of I frames in an MPEG stream, images are preferably divided into 8×8 blocks and each one of these blocks are DCT (discrete cosine transform) coded and thresholded for compression purposes.

The system 10 further comprises a metric computation module 14 for computing a variety of difference metrics, each in the form of time series data for the time duration of the video. In a preferred embodiment, the metric computation module 14 employs three difference metric computation processes: an interframe difference metric computation process 15, an intensity histogram difference metric computation process 16 and an intensity variance difference metric computation process 17, each of which is explained in detail below.

Figure 3A:
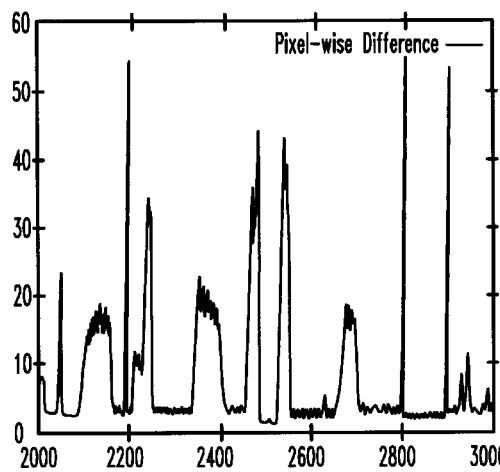
FIGS. 3a, 3b and 3c are exemplary graphs of computed time series for an interframe difference metric, an interframe variance difference metric and an histogram difference metric, respectively, for a thousand frames of an inspection video.
Figure 3B:
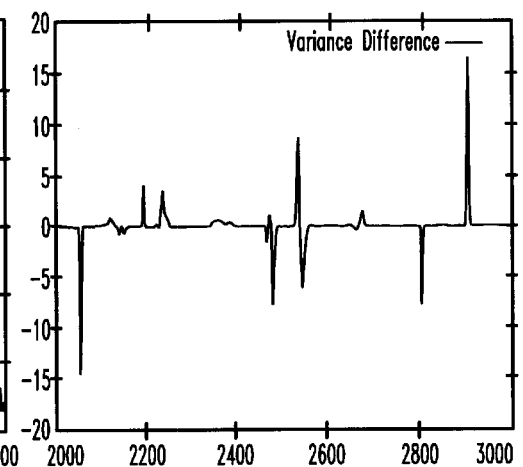
Figure 3C:
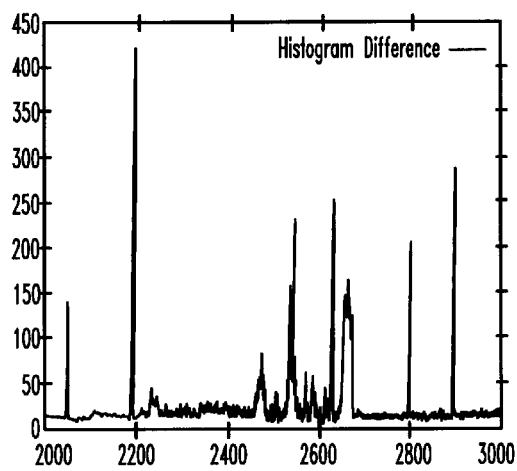

The output of the metric computation module 14 is a time series of data for each metric. Thus, at every time point in each time series, there is a real number representing the value of these metrics. In the preferred embodiment, there are three time sequences representing the computed difference metrics between frames. More specifically, FIGS. 3a, 3b and 3c are exemplary graphs of computed time series for the interframe difference metric, the interframe variance difference metric and the histogram difference metric, respectively, for a thousand frames of an inspection video.

The system 10 further comprises a scene change detector module 18 comprising a scene change identification module 19 and a scene change validation module 20. In general, the scene change identification module 19 outputs or otherwise flags potential scene change locations in the video data for each of the sequences of time series: data output from the metric computation module 14. More specifically, in a preferred embodiment, the scene change identification module 19 processes each of the computed time series data in selected time windows and adaptively computes threshold levels for the time windows to identify candidate scene change frames within such time windows. A shot identification process according to one aspect of the present invention using adaptive thresholds is discussed in further detail below.

In the preferred embodiment, for each input sequence of times series data, the scene change identification module 19 outputs a data sequence comprising boolean variables, i.e., a sequence of "1s" and "0s" respectively representing candidate and non-candidate scene change locations (frames) identified by the scene change identification module 19.

The scene change validation module 20 processes the output data from the scene change identification module 19 in an integrative manner using a plurality of conditions to validate or otherwise verify that the potential candidates for scene changes identified by the scene change identification module 19 are indeed independent scenes (or shots). More specifically, in the preferred embodiment, the data sequences associated with the interframe and histogram difference metric are processed to validate candidate scene changes as abrupt scene changes and the data sequence associated with the interframe variance difference is used to validate candidate scene changes as gradual scene changes. This validation process is described in further detail below.

After the different scenes (shots) are determined, the scene change validation module 20, as an additional validation process, extracts keyframes from each of the shots and compares neighboring keyframes. If the keyframes are not sufficiently different, the corresponding shots are merged. A new keyframe is extracted which, in turn, is compared against its neighbors. The process terminates when there are no additional changes. Again, a preferred validation process will be described in greater detail below.

Figure 3D:
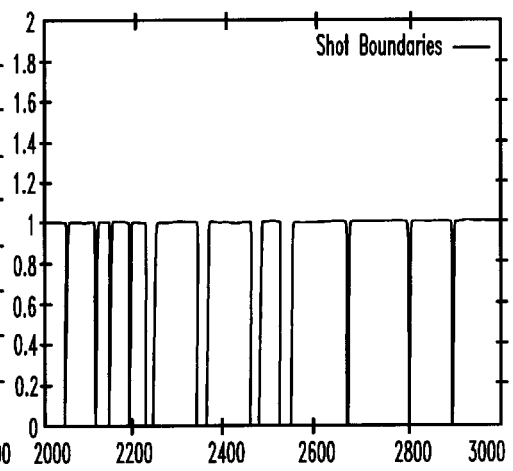
FIG. 3d is an exemplary graph of a final shot segmentation for the same thousand frames.

The output of the scene change detector module 18 is a list of scenes (or shots) corresponding to the input video data. More specifically, the output comprises a single data sequence having a duration equal to the video input and comprising boolean variables, i.e., a sequence of "1s" and "0s" respectively representing frames that are deemed shots and frames that are deemed scene changes. For instance, FIG. 3d represents the output for the same frames as FIGS. 3a–3c. If the value for a given frame is "1", the frame belongs to a shot, whereas if the value for a frame is "0", the frame belongs to a scene change. The correspondence between the peaks in the time series representing the difference metrics (FIGS. 3a–3c) and the locations of the scene changes (FIG. 3d) is readily apparent. From this data sequence, a shot list may be generated and stored in a shot list database 21. The shot lists may be used by video processing/indexing systems for, e.g., multimedia and/or video summarization. The final shot list may be output for manual editing as necessary.

Figure 2A:
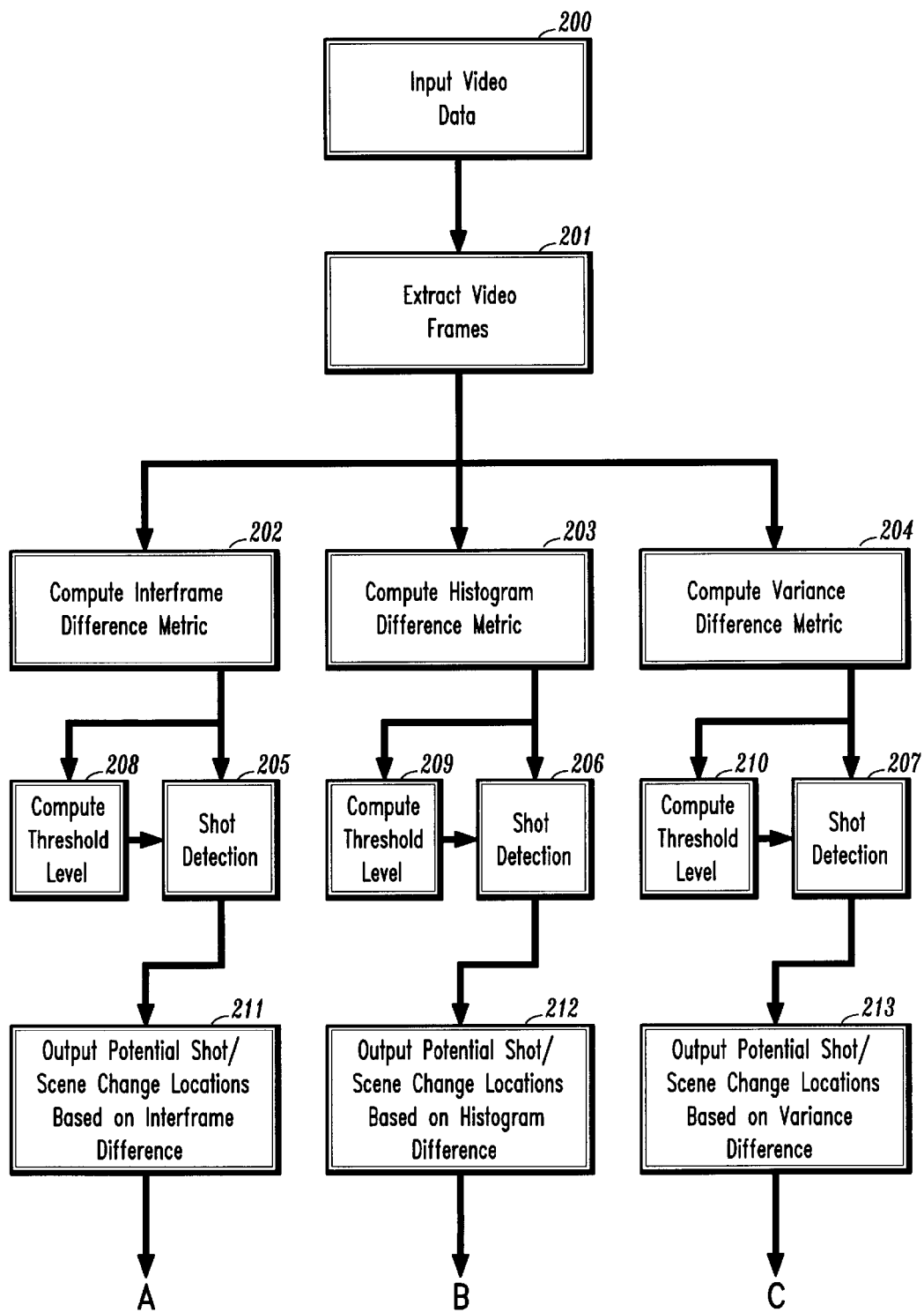
FIGS. 2A and 2B comprise a flow diagram of a method for detecting scene changes according to one aspect of the present invention.
Figure 2B:
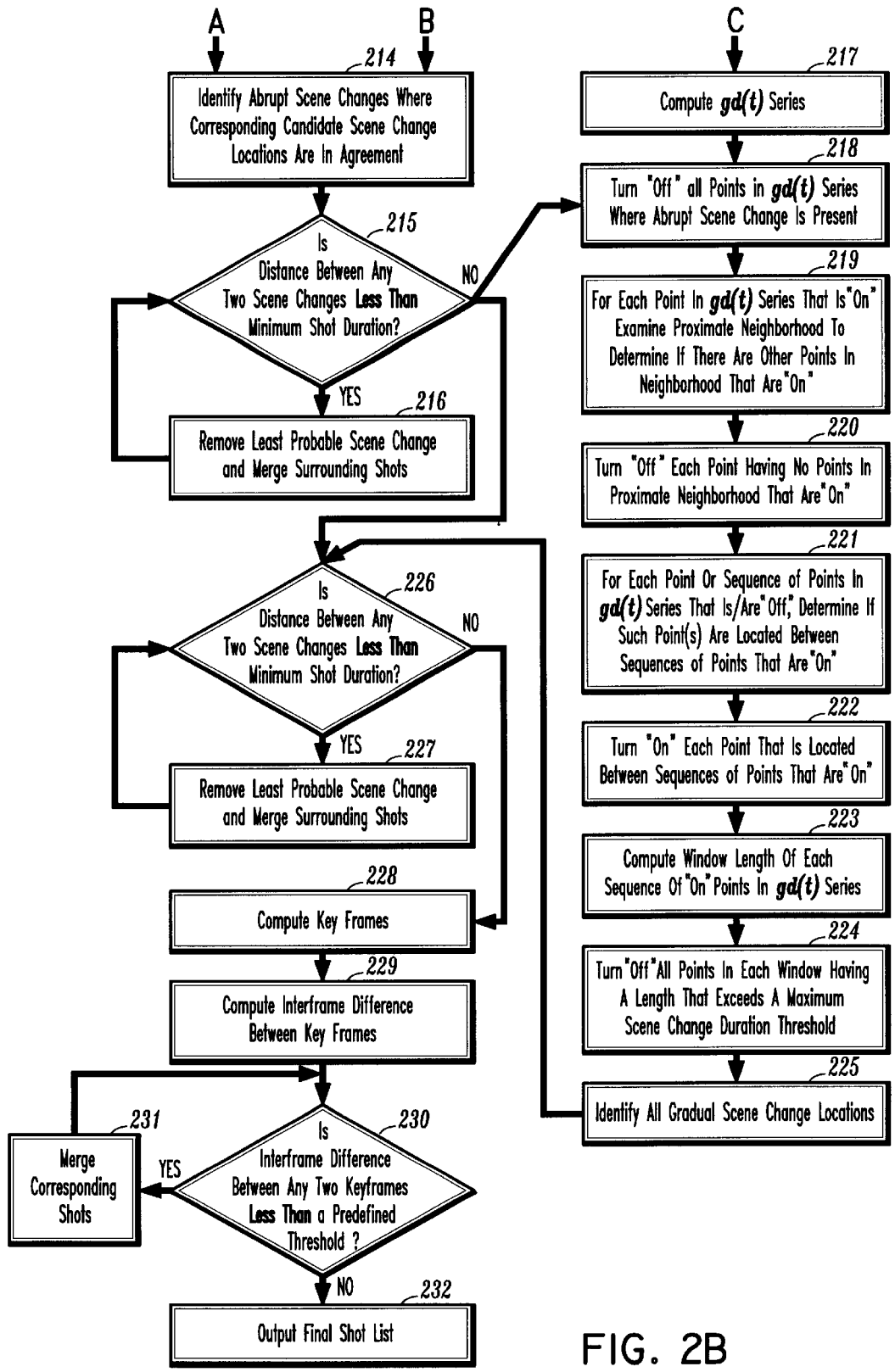

An exemplary method of operation of the system of FIG. 1 according to a preferred embodiment of the present invention will now be explained in detail with reference to the flow diagrams of FIGS. 2A and 2B. Initially, referring to FIG. 2A, video data (e.g., a video/multimedia file, video data stream, etc.) is input to the system 10 (step 200) and video frames are extracted from the video data (step 201). The video frame capture process is discussed above in connection with the data acquisition module 13. It is to be understood that depending upon the desired accuracy, the resolution, both in time and space, at which to execute the algorithm is predetermined.

Next, in a preferred embodiment, three different metrics are computed to determine the scene changes. For instance, one metric is obtained by computing the interframe difference (step 202) as follows:

$$dt = \sqrt{\left(\frac{1}{MN}\right)\sum_{ij}(f_{xy}(t)-f_{xy}(t-1))^2} \quad (1)$$

For uncompressed images, $f_{xy}(t)$ is the pixel value of the frame at location (x,y) and M and N are the number of pixels in the x and y directions respectively. This equation is applicable with respect to DCT coded images without having to actually decode such images since the DCT is a linear operation:

$$DCT(f_{xy}(t)-f_{xy}(t-1))=DCT(f_{xy}(t))-DCT(f_{xy}(t-1)) \quad (2)$$

This is equally applicable with respect to Inverse DCT. Hence, the frame difference can be computed directly in the DCT domain. It is to be appreciated that abrupt changes are best characterized by large interframe differences and, consequently, the interframe difference can be used to detect such abrupt changes.

Another metric that is computed is the histogram difference metric (step 203). A preferred process for computing this metric is as follows. First, the intensity range of a given frame is divided into a number of predefined bins, with each bin corresponding to an intensity range. Next, the number of pixels in each bin is counted to generate the corresponding distribution comprising the histogram. This process is straightforward for uncompressed images. For a DCT compressed image, the histogram can be approximated from the DCT coefficients using any suitable conventional method such as the method discussed in the reference by N. V. Patel et al., entitled "Compressed video processing for cut detection," *IEEE Proc. Vis. Image Signal Proc.*, 143:315–323, 1996. Briefly, with this method, the intensity distribution of an image is approximated to a normal, and based on that assumption, it is possible to compute the histogram based on the mean and variance of the individual blocks (in the DCT image), each of which can be computed directly from the DCT coefficients. Such an approximation, however, may not necessarily be true, especially for artificially created animations. But for most natural images, this assumption is likely to be true.

Once the histogram is determined, the histogram difference between frames may be computed as follows:

$$h_t = \frac{1}{N_b} \sum_b \|hr_b(t) - hr_b(t-1)\| \tag{3}$$

where $N_b$ is the number of bins and $h_{rb}(t)$ is the count in bin b at time t.

Another metric that is computed in the preferred embodiment is an interframe difference in the variance (step 204). As demonstrated below, the interframe variance difference metric is useful for the analysis of gradual changes in video sequences. For uncompressed images, the variance $\sigma^2$ may be computed as follows:

$$\sigma^2 = \frac{1}{MN} \sum_{ij} f_{xy}^2 - \mu^2 \tag{4}$$

where $$\mu = \frac{1}{MN} \sum_{ij} f_{xy} \tag{5}$$

and where M, N and $f_{xy}$ are as defined above.

Using Parseval's theorem (see, e.g., K. R. Rao and P. Yip. *Discrete Cosine Transform: Algorithms, advantages, applications*. Academic Press, 1990), the variance of an image in the compressed domain may be computed as follows:

$$\sigma^2 = \frac{1}{MN} \sum_{uv} F_{uv}^2 - F_{00}^2 \tag{6}$$

where $F_{uv}$ are the DCT coefficients.

It is to be appreciated that the interframe variance difference metric is particularly useful for the analysis of gradual changes in video sequences. This is demonstrated as follows. Assume $j_1(t)$ and $j_2(t)$ are two sequences with respective variances $\sigma_1^2$ and $\sigma_2^2$. In a "fade out," the intensity of $f_1(\ )$ linearly decreases to 0 from normal, whereas in a "fade in," the intensity of $f_2(\ )$ linearly increases from 0 to normal. In the case of a "dissolve," the intensity changes linearly from $f_1(\ )$ to $f_2(\ )$ within the dissolve time $t_1 \leq r \leq t_2$, i.e.:

$$f(t) = f_1(t)[1-\alpha(t)] + f_2(t)\alpha(t) \tag{7}$$

where $\alpha(t) = (t-t_1)/(t_2-t_1)$. Accordingly, the variance of f(t) during a dissolve is given by:

$$\sigma^2(t) = (\sigma_1^2 + \sigma_2^2)\alpha^2(t) - 2\sigma_1^2\alpha(t) + \sigma_1^2 \tag{8}$$

which takes the shape of a parabola, and the interframe variance difference is given by:

$$v(t) = 2(\sigma_1^2 + \sigma_2^2)\frac{(t-t_1)}{(t_2-t_1)^2} - 2\frac{\sigma_1^2}{(t_2-t_1)} \tag{9}$$

which is a linear function going from a negative value of $$-\frac{2\sigma_1^2}{t_2 - t_1}$$

to a positive value of $$\frac{2\sigma_1^2}{t_2 - t_1},$$

with a zero crossing at the middle. For a "fade out," only half of this will be seen with the other half being seen for a "fade in."

In practice, due to motion and noise in a video sequence, it is unlikely that either the pure linear or parabolic shape will be preserved. Instead, a similar trend for gradual scene changes is likely to be seen. For abrupt scene changes, the difference in variance is likely to result in a spike. One advantage associated with the difference in variance metric is that it is not adversely affected by small object motion.

It is to be understood that because of frame repetition, there may be points of little or no apparent difference in the collected time series. In this situation, such points may be ignored.

Returning again to FIG. 2A, after the various metrics are computed (steps 202–204), the next steps involve detecting scene changes using each of the respective computed metric data (steps 205–207) and computing the corresponding thresholds (steps 208–210).

In particular, the interframe difference metric data may be analyzed to detect scene changes (step 205) in the following manner. Assume that at location (ij) the interframe difference signal is given by $d_{ij}=f_{ij}(t)-f_{ij}(t-1)$. If there are no scene changes, the distribution of $d_{ij}$ can reasonably be approximated by a normal, i.e, $d_{ij} \sim N(0, \sigma_n^2)$. On the other hand, if there is a scene change, then $d_{ij} \sim N(u_{ij}, \sigma_n^2)$, where $u_{ij}$ is the difference signal due to the scene change and $\sigma_n^2$ is the combined noise variance. Based on this, we can compute the following hypothesis test:

Null Hypothesis: $H_0$: $\mu=0$; Alternate: $H_1$: $\mu \neq 0$

To prove that the null hypothesis is untrue, we can compute the Likelihood ratio test:

$$L = \frac{p(dij \mid H_1)}{p(dij \mid H_0)} \tag{10}$$

It is apparent that under the above normal assumption, this reduces to the test $|d_{ij}| \geq \tau_f$. Instead, the equivalent test $d_{ij}^2 \geq \tau_p$ is considered, where $\tau_p$ is a constant and is related to the power of the test. Since it is desired to verify this for all the pixels, this can be computed for all the pixels, or we can use the derived test:

$$\sum_{ij} d_{ij}^2 \geq \tau_d \tag{11}$$

where $\tau_d \geq 0$ is a suitable threshold.

With respect to the selection of the threshold $\tau_d$ (step 208) for the scene change detection process (step 205), it is to be understood that the choice of a suitable threshold may be predetermined (i.e., a hard threshold). Preferably, the implementation of an adaptive threshold (i.e., soft threshold) that is, e.g., a multiple of the same difference signal in the neighborhood, is used instead of the hard thresholds. It is our experience that while an appropriate choice of the threshold is important, the actual value could well vary between different sections of the video based on the lighting conditions and so forth. The use of a dynamic threshold, however, is more reliable as it adapts itself.

Accordingly, a preferred method for adaptively selecting the threshold (step 208) comprises an initial step of selecting a time window of approximately 5 to 10 seconds (the length of the window is determined based on the activity in the video). It is to be appreciated that the use of this time window affords several advantages. For instance, the use of the window allows the threshold to be computed in accordance with the changing nature of the video. Indeed, when significant changes in the metric values occur, e.g., due to changes in the lighting condition (indoor/outdoor) from one set of frames to the next, adaptively modifying the threshold to meet such conditions will increase the accuracy of the shot detection. Another advantage in the use of the time window is that the computation of the threshold remains relatively simple. This feature is particularly advantageous in real-time applications where such computation only provides a delay equal to the time window.

After the time window is selected, the next step is to determine the minimum (min) and maximum (max) values of the interframe difference metric within the window. Once the minimum and maximum values are determined, the threshold level is computed as follows:

$$\tau_d = \min + \frac{(\max - \min)}{3}.$$

This threshold level is then applied to the frames within the selected window.

In a preferred embodiment, the histogram difference metric given by equation (3) above is also analyzed to detect scene changes (step 206). It is to be understood that other conventional metrics may be used for this metric such as the so called $X^2$ statistic given by:

$$\chi^2 = \sum_b \frac{\|hr_b(t) - hr_b(t-1)\|^2}{\|hr_b(t) + hr_b(t-1)\|} \quad (12)$$

It is known, however, that while this statistic is more sensitive to interframe difference across a camera break, it also enhances the differences arising out of small object or camera motion. Further, it is computationally more expensive. Thus, the overall performance is not necessarily better than the performance realized using the metric of equation (3) above (see, H. Zhang, A. Kankanhalli, and S. Smoliar, "Automatic partitioning of full motion video," *Multimedia Systems*, 1:10–28, 1993). Consequently, for abrupt scene changes the preferred metric is:

$$h_t = \frac{1}{Nb} \sum_b \|hr_b(t) - hr_b(t-1)\| \geq \tau_h \quad (13)$$

where, $\tau^h$ is an appropriate threshold.

With regard to selecting this threshold (step 209), the preferred method discussed above (for step 208) is also applied. A time window of approximately 5 to 10 seconds is selected depending on the activity in the video. Then, the minimum (min) and maximum (max) values of the histogram difference metric within the selected window are determined. Once the minimum and maximum values are determined, the threshold level $\tau_h$ is computed as follows:

$$\tau_h = \min + \frac{(\max - \min)}{3}.$$

Furthermore, in the preferred embodiment, the interframe variance difference metric is analyzed to detect scene changes (step 207) in the following manner. Assume, as before, that the pixel values are normally distributed. Thus, the variance is chi-square distributed. If the individual pixels are normally distributed with a variance σ, then the probability density function of the variance v at any point of time is given by $$p_V(v) = \frac{1}{(2\sigma)^{n/2}\Gamma(n/2)} v^{(-1+n/2)} e^{-v/(2\sigma^2)} \quad (14)$$

where n is the number of pixels in the image. The hypothesis in this case consists of:

Null Hypothesis: $H_0$: σ=$\sigma_1$; Alternate: $H1$: σ=$\sigma_2$, where $\sigma_1 \neq \sigma_2$.

We construct a similar Likelihood ratio given by:

$$L = \frac{p(v \mid H_i)}{p(vH_0)} \quad (15)$$

and it is easy to show that the result is:

$$v \geq \tau \quad (16)$$

Since the variance is typically assumed not to change from frame to frame, the only time the interframe difference in the variance changes is in the midst of a scene change. Consequently, we consider the derived test:

$$|v(t) - v(t-1)| \geq \tau_v \quad (17)$$

where $\tau_v$ is an appropriate threshold.

The threshold $\tau_v$ is selected in an adaptive fashion (step 210). In particular, a preferred method for selecting the threshold level $\tau_v$ proceeds as follows. Initially, a time window around the point of interest is selected in the same manner as discussed above. For the selected time window, the computed values of the variance difference metric (computed from equation (17)) are arranged in an increasing order. The threshold $\tau_v$ is then selected as the $m_{th}$ order statistic, i.e., m=(1−α)n, where m is the computed threshold, n denotes the total number of frames in the time window, and α denotes a fraction of points that are part of a gradual scene change in the video. The value of α is a user-selected value that may often be selected by taking a cursory glance at the video. Preferably, the value for α is either 0.05 or 0.1. This value, however, may change depending on the video. It is to be appreciated that since this is related to the time duration, it is much easier to guess than a pixel value. Here, that pixel-based threshold $\tau_v$ is derived.

After the raw time series data has been processed as described above, the output of each of the scene change detection processes are potential shots/scene change locations based on the respective metrics (steps 211, 212 and 213), both abrupt and gradual. The next steps in the preferred scene change detection process involve identifying and validating the scene changes based on various conditions. For instance, referring to FIG. 2b, in the preferred embodiment, abrupt scene changes are identified where the candidate scene change locations output from the shot detection processes of the interframe and histogram difference metrics are in agreement (step 214). In particular, abrupt scene changes are identified by verifying that the conditions regarding both the interframe difference metric and the histogram difference are satisfied. It is to be appreciated that by integrally utilizing the scene change candidates output from such shot detection processes, false alarms in identifying scene changes that may occur due to small motion where the interframe difference is high (and thus exceed the threshold $\tau_d$ in equation 11 above) will not occur since the condition for the histogram difference for the candidate must also be satisfied. (in which case, for small motion, such condition typically will not be satisfied).

After the locations of the abrupt scene changes are identified, a determination is made as to whether any two of the identified abrupt scene changes (or cuts) are less than a predefined minimum shot duration (step 215). This step ensures that two abrupt scene changes are not within an immediate neighborhood. Indeed, in most videos, any particular shot lingers for a certain minimum time period to attract the viewer's attention. The minimum duration of a shot, however, varies from one film to the other, and is, thus, best defined by a user. Accordingly, if the distance of any two identified cuts are less than the predefined minimum duration (affirmative determination in step 215), the cut that is least probable in that neighborhood is removed and the two surrounding shots are merged (step 216). Since abrupt changes are defined primarily by the interframe difference and the histogram difference, these two metrics are used to determine the dominant cut. The dominant cut may be determined based on the amount that the computed metrics exceed their respective thresholds. This process (steps 215 and 216) is repeated until all of the identified abrupt scene changes meet the minimum shot duration threshold.

In addition to identifying abrupt scene changes, the preferred method includes identifying gradual scene changes. This process is performed as follows. Initially, a time series (or sequence), referred to herein as gd(t), is computed (step 217). This sequence is computed by setting all points to logic "1" (i.e., the points are turned "on") wherever the corresponding absolute value of the difference in variance metric is higher than the selected threshold (as discussed above using the order statistic method). All other points in the sequence gd(t) are set to logic "0" (i.e., the points are turned "Off"). All the points that are set to "1" in the sequence gd(t) are deemed candidates to be part of a gradual scene change.

Next, to ensure that gradual scene changes are not selected where abrupt scene changes exist, all points in the sequence gd(t) that are set to logic "1" (in step 217) are turned off (set to "0") at all points where abrupt scene changes are present (step 218) (using the information resulting from step 215). Then, for each point in the sequence gd(t) that is "on," the proximate neighborhood is examined to determine if there are several other points in that neighborhood that are turned "on." (step 219). This step is performed because gradual scene changes are expected to exist over several frames. Therefore, for each point that is considered, if there are no points in the proximate neighborhood that are turned "on," then the point will be turned "off" (step 220). In other words, this step ensures that spikes are not considered as candidates for gradual scene changes.

Next, for each point or sequence of points in the gd(t) series that is/are "off", a determination is made as to whether such point(s) is/are located between sequences of points that are "on" (step 221). This step addresses situations such as dissolve. In this case, as demonstrated before, the difference in variance is likely to traverse a path in which it goes from a negative value to a positive value. Thus, the series gd(t) in the neighborhood of a dissolve is characterized by several "1s", followed by one or several "0s" and then again by several "1s". In such a case, those "0" points that are sandwiched between sequences of "1s" are turned "on" (set to "1") (step 222). This step also addresses some noise issues as a result of which there might be some points where the normal trend is not violated.

At this point in the process, the sequence gd(t) comprises a series of points that are mostly "0" with small, interspersed, windows of sequences of "1s" (i.e., the points that are "on" are grouped and not isolated). To verify that the duration of each individual scene change (i.e., window of "1s") is not too large, the length (duration) of each window is computed (step 223) and then compared with a predefined duration threshold. For example, one can assume that the maximum duration for a scene change should be no more than one or two seconds. This threshold level is preferably user-defined because such threshold depends on the type of film being processed. When the approximate maximum duration is known, since the frames/sec is always known, the maximum frame duration for the scene change is readily ascertainable. If any of the windows have a duration that exceeds this threshold, it may be assumed that the window in question not likely to be a gradual scene change. In such as case, further examination becomes necessary. The possibilities are that either the window represents just motion or a combination of scene change and motion. In the preferred embodiment, if any window has a duration that exceeds the predefined duration threshold, it is assumed that the window represents motion and, consequently, all points in such window are turned "off" (step 224). All the remaining windows are then identified as candidates for gradual scene changes (step 225).

After the candidate abrupt and gradual scene changes are identified, a determination is made as to whether the distance between any candidate scene changes are less than the minimum shot duration (step 226). It is to be appreciated that this step eliminates the existence of two consecutive scene changes, either abrupt or gradual, that are in close proximity. If two scene changes are less than the minimum shot duration (affirmative determination in step 226), then the least probable scene change for the given video is removed and the surrounding shots are merged (step 227). The determination for removing the scene change may be user driven or based on the frequency of the two different types of changes. This process (steps 226 and 227) is repeated until all scene changes are separated by at least the desired threshold distance.

The output result is a series of shots separated by the identified scene changes. Next, a keyframe is computed for each shot (step 228). In the preferred embodiment, for each shot, the key frame is selected to be the frame that lies at the center of the shot. Each keyframe is then compared with its neighboring keyframe by computing the interframe difference between each keyframe (step 229). If the interframe difference between two neighboring keyframes falls below a predetermined threshold (affirmative determination in step 230), then the corresponding shots are merged (step 231) and then again verify the keyframe of this combined keyframe to its neighbors. This process is repeated for the entire sequence of shots and terminates when a pass through the entire list generates no further change (negative determination in step 230).

Then, the final shot list is output (step 232). A video editing tool may be utilized by the user so that the user can view the different shots and corresponding key frames. If necessary, the user can either edit the duration of the shots, or merge/break them and any other necessary operation resulting in a larger accuracy rate.

In summary, the present invention provides a method for detecting scene changes using a plurality of different metrics in an integrated manner to accurately identify scene changes, both abrupt and gradual, for, e.g., segmenting a video into shots. One advantage of the present invention is the implementation of the difference of interframe variance metric, which is a novel metric that is extremely useful for identifying gradual scene changes. Another advantage is that, unlike conventional methods that use a hard threshold, the present invention employs an adaptive threshold selection process for all the metrics utilized such as the order statistics for the threshold selection in the case of the difference of variance. The use of adaptive thresholds renders the scene detection system and methods described herein more user friendly and reliable than conventional methods. Another advantage is the systematic strategy for shot pruning using a plurality of sequential rules that candidate scene changes must follow before a particular candidate is finally selected.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for detecting scene changes in a video, comprising the steps of:
   computing a plurality of difference metrics of successive frames in a sequence of video frames, wherein the plurality of difference metrics comprise an interframe difference metric, a histogram difference metric, and an interframe variance difference metric;
   automatically identifying candidate scene changes in the sequence of video frames using each of the computed difference metrics, wherein the candidate scene changes comprise abrupt scene changes that are identified using a combination of the computed interframe difference and histogram difference metrics, and gradual scene changes that are identified using the computed interframe variance difference metric; and
   verifying that the candidate scene changes satisfy at least one predetermined condition for selecting final scene changes,
   wherein the step of identifying candidate scene changes comprises the steps of:
      identifying a given video frame as a candidate scene change based on the interframe difference metric, if the computed interframe difference between the given video frame and a previous video frame satisfies a first threshold;
      identifying a given video frame as a candidate scene change based on the histogram difference metric, if the computed histogram difference between the given video frame and a previous video frame satisfies a second threshold; and
      identifying a given video frame as a candidate scene change based on the interframe variance difference metric, if the computed interframe variance difference between the given video frame and a previous video frame satisfies a third threshold,
   wherein the step of verifying comprises the steps of:
      (a) selecting as a potential abrupt scene change, each video frame that was identified as a candidate scene change based on both the interframe difference metric and the histogram difference metric;
      (b) removing a least probable one of any two successive potential abrupt scene changes, if a distance between the two successive potential abrupt scene changes is less than a predetermined minimum shot duration;
      (c) selecting as a potential gradual scene change, each video frame that was identified as a candidate scene change based on the interframe variance difference metric;
      (d) removing as a potential gradual scene change, each video frame selected in step (c) that is also a potential abrupt scene change remaining after step (b);
      (e) for each potential gradual scene change remaining after step (d), determining if there are proximate frames that were selected as potential gradual scene changes;
      (f) removing as a potential gradual scene change, each frame having no proximate frames that were selected as potential gradual scene changes;
      (g) for each frame remaining after step (f) that is not selected as a potential gradual scene change, determining if the frame is located between sequences of frames that are selected as potential gradual scene changes;
      (h) selecting each frame in step (g) as a potential gradual scene change if the frame is determined to be located between sequences of frames that are selected as potential gradual scene changes;
      (i) determining a length of each sequence of potential gradual scene changes remaining after step (h);
      (j) comparing the length of each sequence to a predetermined scene change duration threshold; and
      (k) removing as a potential gradual scene change location, each frame of each sequence having a length that exceeds the predetermined scene change duration threshold.

2. The method of claim 1, wherein the video frames are compressed.

3. The method of claim 1, further comprising the step of dynamically computing the first, second and third thresholds.

4. The method of claim 3, wherein the step of dynamically computing the first threshold comprises the steps of:
   selecting a window of a predetermined number of frames;
   determining a minimum value and maximum value of the computed interframe difference metric associated with the frames in the window; and
   computing the first threshold based on the determined minimum and maximum values.

5. The method of claim 3, wherein the step of dynamically computing the second threshold comprises the steps of:
   selecting a window of a predetermined number of frames;
   determining a minimum value and maximum value of the computed histogram difference metric associated with the frames in the window; and
   computing the second threshold based on the determined minimum and maximum values.

6. The method of claim 3, wherein the step of dynamically computing the third threshold comprises the steps of:

selecting a window comprising n frames;
arranging in increasing order, the computed values of the interframe variance difference associated with the n frames in the window; and
computing the third threshold as an $m^{th}$ order statistic, where $m=(1-\forall)n$ and $\forall$ denotes a user selected variable.

7. The method of claim 1, wherein the step of verifying further comprises the steps of:
(l) determining if the distance between any two successive potential scene changes is less than the predetermined minimum shot duration threshold, the potential scene changes comprising the potential abrupt scene changes remaining after step (b) and the potential gradual scene changes remaining after step (k); and
(m) removing a least probable one of any two successive potential scene changes, if the distance between the two successive potential scene changes is less than the predetermined minimum shot duration.

8. The method of claim 7, wherein the step of verifying further comprises the steps of:
(n) computing a keyframe for each shot generated by the potential scene changes remaining after step (m);
(o) computing an interframe difference between the keyframe of successive shots;
(p) merging successive shots with keyframes having a computed interframe difference that is less than a predetermined threshold; and
(q) selecting as final scene changes, the potential scene changes associated with the shots remaining after step (p).

9. A program storage device readable by a machine, tangibly embodying a program of instructions executable by the machine to perform method steps for detecting scene changes in a video, the method comprising the steps of:
computing a plurality of difference metrics of successive frames in a sequence of video frames, wherein the plurality of difference metrics comprise an interframe difference metric, a histogram difference metric, and an interframe variance difference metric;
automatically identifying candidate scene changes in the sequence of video frames using each of the computed difference metrics, wherein the candidate scene changes comprise abrupt scene changes that are identified using a combination of the computed interframe difference and histogram difference metrics, and gradual scene changes that are identified using the computed interframe variance difference metric; and
verifying that the candidate scene changes satisfy at least one predetermined condition for selecting final scene changes,
wherein the instructions for performing the step of identifying candidate scene changes comprise instructions for performing the steps of:
identifying a given video frame as a candidate scene change based on the interframe difference metric, if the computed interframe difference between the given video frame and a previous video frame satisfies a first threshold;
identifying a given video frame as a candidate scene change based on the histogram difference metric, if the computed histogram difference between the given video frame and a previous video frame satisfies a second threshold; and
identifying a given video frame as a candidate scene change based on the interframe variance difference metric, if the computed interframe variance difference between the given video frame and a previous video frame satisfies a third threshold,
wherein the instructions for performing the step of verifying comprise instructions for performing the steps of:
(a) selecting as a potential abrupt scene change, each video frame that was identified as a candidate scene change based on both the interframe difference metric and the histogram difference metric;
(b) removing a least probable one of any two successive potential abrupt scene changes, if a distance between the two successive potential abrupt scene changes is less than a predetermined minimum shot duration;
(c) selecting as a potential gradual scene change, each video frame that was identified as a candidate scene change based on the interframe variance difference metric;
(d) removing as a potential gradual scene change, each video frame selected in step (c) that is also a potential abrupt scene change remaining after step (b);
(e) for each potential gradual scene change remaining after step (d), determining if there are proximate frames that were selected as potential gradual scene changes;
(f) removing as a potential gradual scene change, each frame having no proximate frames that were selected as potential gradual scene changes;
(g) for each frame remaining after step (f) that is not selected as a potential gradual scene change, determining if the frame is located between sequences of frames that are selected as potential gradual scene changes;
(h) selecting each frame in step (g) as a potential gradual scene change if the frame is determined to be located between sequences of frames that are selected as potential gradual scene changes;
(i) determining a length of each sequence of potential gradual scene changes remaining after step (h);
(j) comparing the length of each sequence to a predetermined scene change duration threshold; and
(k) removing as a potential gradual scene change location each frame of each sequence having a length that exceeds the predetermined scene change duration threshold.

10. The program storage device of claim 9, wherein the video frames are compressed.

11. The program storage device of claim 9, further comprising instructions for performing the step of dynamically computing the first, second and third thresholds.

12. The program storage device of claim 11, wherein the instructions for performing the step of dynamically computing the first threshold comprise instructions for performing the steps of:
selecting a window of a predetermined number of frames;
determining a minimum value and maximum value of the computed interframe difference metric associated with the frames in the window; and
computing the first threshold based on the determined minimum and maximum values.

13. The program storage device of claim 11, wherein the instructions for performing the step of dynamically computing the second threshold comprise instructions for performing the steps of:

selecting a window of a predetermined number of frames;

determining a minimum value and maximum value of the computed histogram difference metric associated with the frames in the window; and computing the second threshold based on the determined minimum and maximum values.

14. The program storage device of claim 11, wherein the instructions for performing the step of dynamically computing the third threshold comprise instructions for performing the steps of:

selecting a window comprising n frames;

arranging in increasing order, the computed values of the interframe variance difference associated with the n frames in the window; and computing the third threshold as an $m^{th}$ order statistic, where $m=(1-\forall)n$ and $\forall$ denotes a user selected variable.

15. The program storage device of claim 9, wherein the instructions for performing the step of verifying further comprise instructions for performing the steps of:

(l) determining if the distance between any two successive potential scene changes is less than the predetermined minimum shot duration threshold, the potential scene changes comprising the potential abrupt scene changes remaining after step (b) and the potential gradual scene changes remaining after step (k); and (m) removing a least probable one of any two successive potential scene changes, if the distance between the two successive potential scene changes is less than the predetermined minimum shot duration.

16. The program storage device of claim 15, wherein the instructions for performing the step of verifying further comprise instructions for performing the steps of:

(n) computing a keyframe for each shot generated by the potential scene changes remaining after step (m);

(o) computing an interframe difference between the keyframe of successive shots;

(p) merging successive shots with keyframes having a computed interframe difference that is less than a predetermined threshold; and (q) selecting as final scene changes, the potential scene changes associated with the shots remaining after step (p).

\* \* \* \* \*